(12) United States Patent
Watanabe et al.

(10) Patent No.: US 6,433,832 B2
(45) Date of Patent: *Aug. 13, 2002

(54) IMAGE DISPLAY APPARATUS AND PERSONAL COMPUTER FOR DISPLAYING PERSONAL COMPUTER SIGNALS AND BROADCAST SIGNALS

(75) Inventors: Toshimitsu Watanabe, Yokohama; Masahisa Tsukahara, Fujisawa; Nobuaki Kabuto, Kunitachi, all of (JP)

(73) Assignees: Hitachi, Ltd., Tokyo; Hitachi Video and Information System, Incorporated, Yokohama, both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/877,113

(22) Filed: Jun. 11, 2001

Related U.S. Application Data

(62) Division of application No. 08/999,232, filed on Dec. 29, 1997.

(30) Foreign Application Priority Data

Dec. 26, 1996 (JP) ............................................. 8-348453

(51) Int. Cl.$^7$ ................................................. H04N 3/27
(52) U.S. Cl. ....................... 348/554; 348/443; 348/448; 348/449; 348/458; 348/556
(58) Field of Search ................................. 348/443, 448, 348/449, 458, 554, 556, 558, 911; H04N 7/01, 11/20, 3/27

(56) References Cited

U.S. PATENT DOCUMENTS 5,132,793 A    7/1992  Hirahata et al. ............ 348/556
5,347,314 A    9/1994  Faroudja et al. ............ 348/448
5,475,442 A   12/1995  Matsushita
5,534,934 A    7/1996  Katsumata et al. ......... 348/445
5,610,663 A    3/1997  Nan et al. .................... 348/448
5,633,687 A    5/1997  Bhayani et al. ............. 348/441
5,657,093 A    8/1997  Park ............................ 348/568
5,742,274 A    4/1998  Henry et al.
5,754,244 A    5/1998  Kahlman .................... 348/448

(List continued on next page.)

FOREIGN PATENT DOCUMENTS

JP    406138834       5/1994
JP    406-225269   *  8/1994
JP       614689       2/1999

*Primary Examiner*—John W. Miller
*Assistant Examiner*—Brian P. Yenke
(74) *Attorney, Agent, or Firm*—Antonelli, Terry, Stout & Kraus, LLP

(57) ABSTRACT

When a video signal is double-speed processed by the first device, a slight vertical deflection process is performed for redundant similar scan lines by the second device, and any slight deflection in the second device is controlled by the first device to enable setting so as to display images with excellent resolution. The first device generates a discrimination signal to designate interlaced scanning and flag a need for vertical scan-line deflection, and such signal is provided to the second device such that the second device can always appropriately determine need for vertical scan-line deflection. Through monitoring for the discrimination signal, an image display apparatus can prevent vertical resolution from deteriorating when video signals possibly requiring vertical line-shifting are inputted from an external source, and can prevent vertical resolution from deteriorating when displaying images of video signals having different systems within different areas on the same screen.

17 Claims, 10 Drawing Sheets

U.S. PATENT DOCUMENTS

| | | | |
|---|---|---|---|
| 5,786,802 A | 7/1998 | Park | 345/127 |
| 5,793,433 A | 8/1998 | Kim et al. | 348/445 |
| 5,812,210 A * | 9/1998 | Arai et al. | 348/555 |
| 5,838,381 A | 11/1998 | Kasahara et al. | 348/458 |
| 5,861,864 A | 1/1999 | Jensen | 345/115 |
| 5,894,332 A * | 4/1999 | Yamagishi | 348/564 |
| 5,896,177 A | 4/1999 | Hwang | 348/445 |
| 5,898,463 A | 4/1999 | Nishiyama | 348/554 |
| 5,907,364 A * | 5/1999 | Furuhata et al. | 348/459 |
| 5,943,097 A * | 8/1999 | Horii | 348/441 |
| 5,963,268 A | 10/1999 | Ko | 348/556 |
| 5,978,041 A | 11/1999 | Masuda et al. | 348/563 |
| 6,008,791 A | 12/1999 | Arai et al. | 345/132 |
| 6,023,262 A | 2/2000 | Eglit | 345/131 |

* cited by examiner

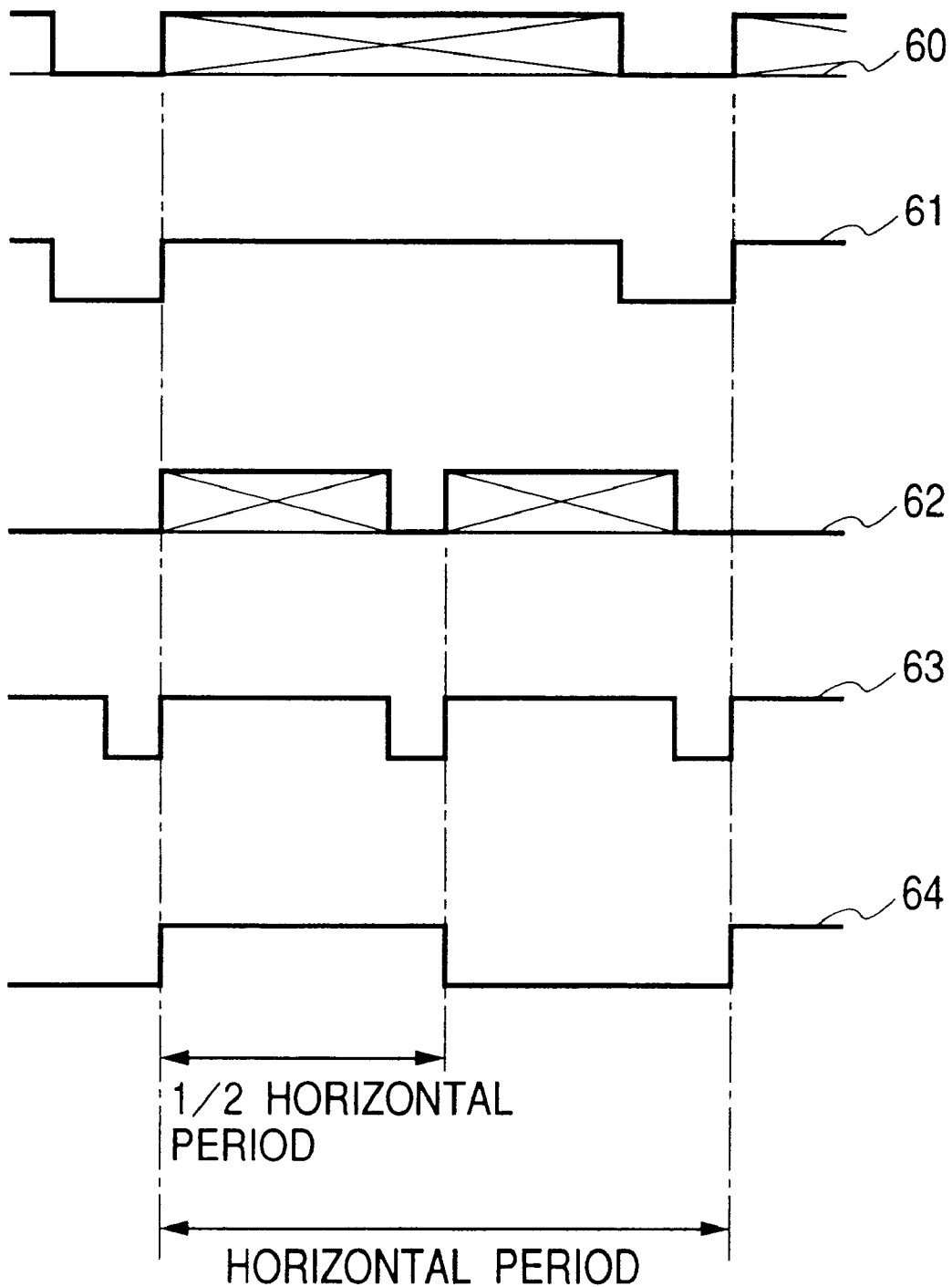

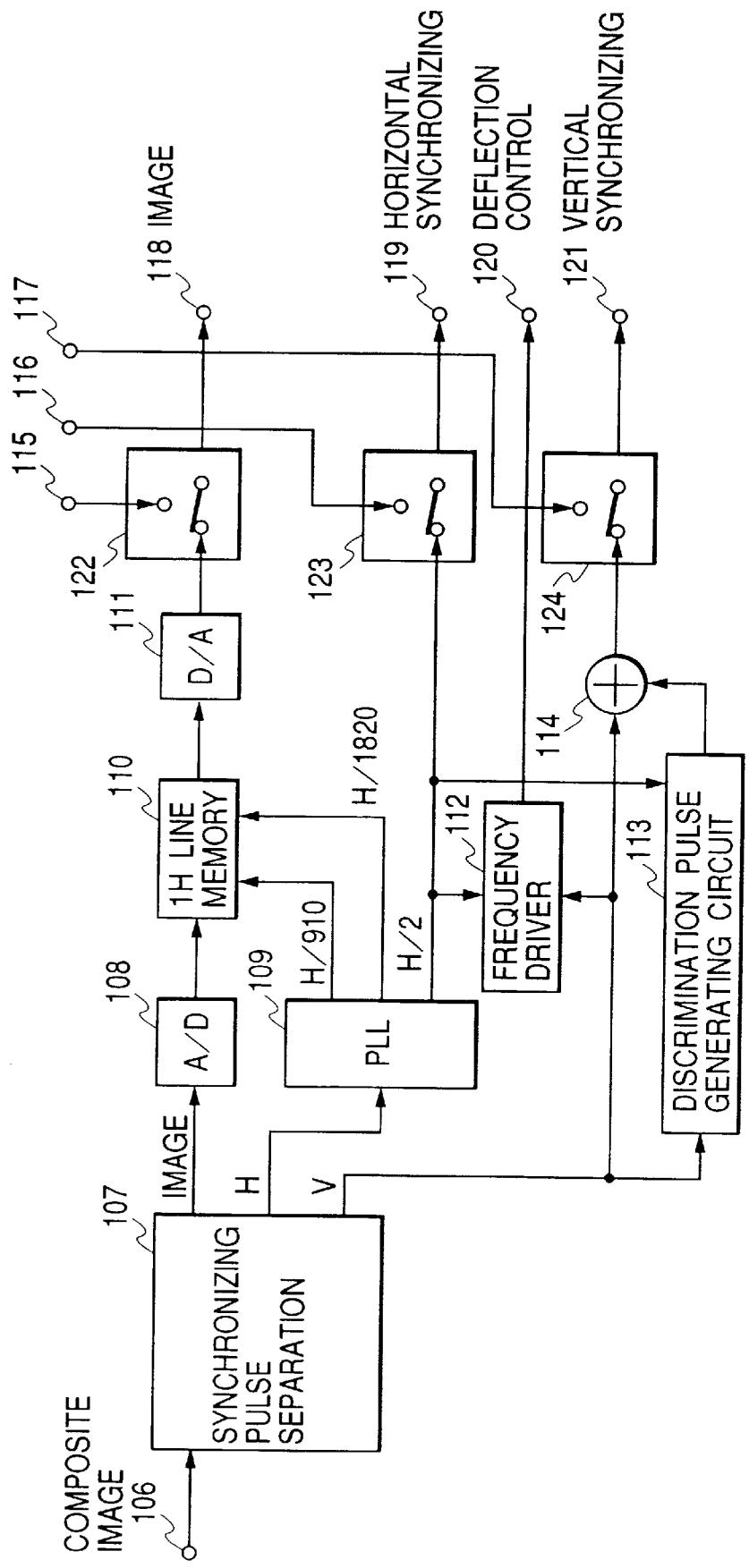

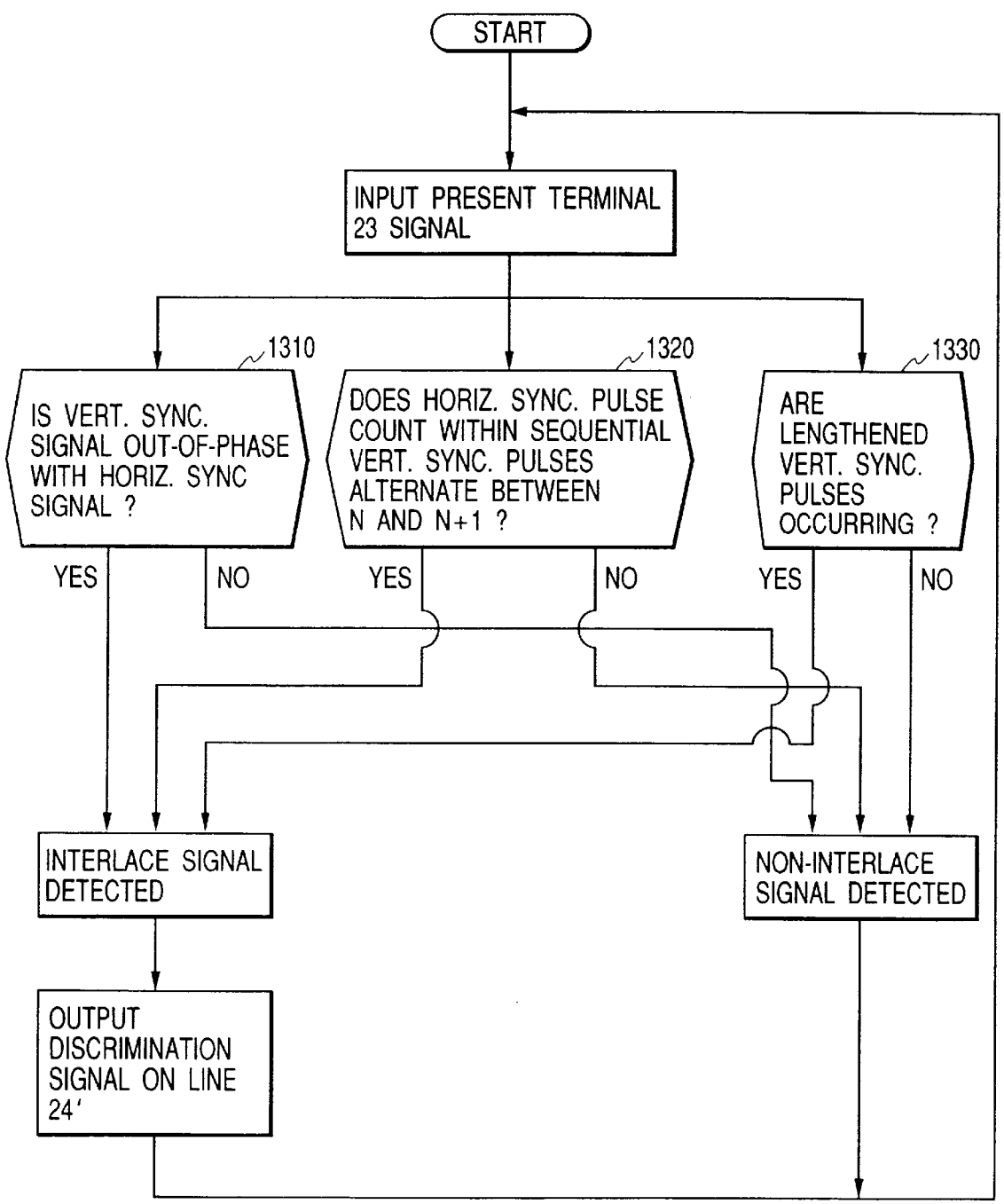

IMAGE DISPLAY APPARATUS AND PERSONAL COMPUTER FOR DISPLAYING PERSONAL COMPUTER SIGNALS AND BROADCAST SIGNALS

REFERENCE TO EARLIER FILED APPLICATION(S)

This application is a division of U.S. application Ser. No. 08/999,232 filed Dec. 29, 1997, allowed.

BACKGROUND OF THE INVENTION

1. Field of the Invention

The present invention relates to a preferred signal display system applicable to image display apparatuses, display devices or television sets for displaying a plurality of video signals having different scanning frequencies such as video signals of the NTSC system, output video signals from personal computers (hereinafter, alternatively referred to as PC signals) and the like. More particularly, the present invention further relates to a multimedia type personal computer capable of outputting both PC display signals (such as VGA signals) and interlace scanning signals (such as an NTSC signal) converted to double-speed (hereinafter, alternatively called "double-speed signal"), and also relates to an image display apparatus possibly connected thereto for displaying both the image of a PC display signal and a double-speed signal, i.e., capable of displaying such differing signals simultaneously as well as at differing times. Especially, the present invention relates to an image display apparatus that has a high picture quality and which is capable of displaying both the image of a PC display signal and a double-speed signal, and to a personal computer connected to it.

2. Description of Related Art

A personal computer of a so-called multimedia type having a capability of outputting both television signals (such as NTSC signals) and PC display signals has been sold in recent years. However, an incompatibility problem arises in that display signals for NTSC system television sets use a 15.75 kHz horizontal deflection frequency, for example, while display signals for personal computers generally use a 31.5 kHz or more horizontal deflection frequency, for example. In order to solve such incompatibility problem, a multimedia computer may have a tuner that can receive broadcast television signals such as NTSC signals, and further may have a double-speed converter for converting a signal demodulated by the tuner to a double-speed signal.

Despite the ability to display the NTSC signal, when an interlace scanning signals such as an NTSC signal is converted to a double-speed signal, it was found that a vertical resolution of this image declines. Still further, in a case where a still image is displayed, vertical resolution degradation becomes visible. The following background is helpful in understanding the resolution degradation problem associated with changing (e.g., doubling) a scanning speed of a display signal (e.g., when changing such scanning speed substantially to match the scanning speed of a second type of display signal and/or display image apparatus being used for display).

More particularly, attention is directed to FIG. 3 and to FIGS. 4a–4b representing an odd-field display frame 70 and even-field display frame 80, respectively, of an interlaced scanning arrangement. Such FIGS. 4a–4b will first be used to describe a normal interlacing operation and an exemplary resolution pattern (which has not experienced resolution degradation). More specifically, in FIG. 4a's display frame 70, assume for a moment that only solid scan lines 71, 73, 75 are present and represent original odd-field scan lines, and that such scan lines 71, 73, 75 are black lines. Similarly, in FIG. 4b's display frame 80, assume that only long/short dashed scan lines 81, 83, 85 are present and represent original even-field scan lines, and that such scan lines 81, 83, 85 are white lines. In normal interlacing (i.e., overlapping FIG. 4a's odd-field display frame 70 onto FIG. 4b's even-field display frame 80), the odd-field and even-field scan lines would be combined in an interlaced fashion to result in a display frame having the following arrangement of scan lines from top to bottom: line 71 (black), line 81 (white), line 73 (black), line 83 (white), line 75 (black), line 85 (white), i.e., to result in an exemplary (alternating) black-white-black-white . . . pattern (not illustrated).

Next, FIG. 3 and FIGS. 4a–4b will be used for purposes of discussion to describe a speed-changed, but resolution degraded, interlacing operation. More specifically, assume again that solid scan lines 71, 73, 75 are present within FIG. 4a and represent original black odd-field scan lines, and that long/short dashed scan lines 81, 83, 85 are present within FIG. 4b and represent original white even-field scan lines. For scanning speed doubling (e.g., when changing such scanning speed substantially to match the scanning speed of a different display signal and/or display apparatus), an original display scanning line waveform 60 (FIG. 3) and its corresponding original horizontal period waveform 61 are each duplicated (via double-speed conversion arrangements described ahead) to become double-speed signals 62 and 63, respectively, having horizontal scanning periods compressed to ½. More particularly, each single scanning line is duplicated into two scanning lines as illustrated in FIGS. 4a–4b. More specifically: original scanning line 71 now becomes dual scanning lines 71, 72; original scanning line 73 now becomes dual scanning lines 73, 74; . . . original scanning line 81 now becomes dual scanning lines 81, 82; original scanning line 83 now becomes dual scanning lines 83, 84; etc.

A problem, however, exists in that as a result of duplication, various odd-field scan lines and various even-field scan lines are now vertically positioned at positions within the odd-field display frame 70 and even-field display frame 80, respectively, such that odd-field scan lines and even-field scan lines will substantially overlap each other during an interlacing operation. For example, white odd-field scan line 72 in a preceding interlace frame will be overlapped by black even-field scan line 81 in a succeeding interlace frame, and vice versa. Such alternating overlapping of white scan lines and black scan lines between frames will appear to the human eye as a grey scanning line. Thus resolution degradation is experienced in that, instead of seeing the expected exemplary (alternating) black-white-black-white . . . pattern, a series of grey scan lines appear as a pattern.

Discussion finally turns to a speed-change operation which avoids the resolution degradation problem, i.e., via vertical shifting of selected scan lines. More particularly, like the immediately preceding example, each single scanning line is duplicated to form two scanning lines as again illustrated in FIGS. 4a–4b. However, this time to avoid the overlapping and resultant resolution degradation problem, a further vertical shifting operation is applied to each duplicate scan line, such that each original scan line and its duplicate scan line are caused to overlap one another. For example, in FIG. 4a, duplicate scan line 72 is vertically shifted (vector or arrow 77) substantially to overlap original scan line 71, using a one-half horizontal period waveform 64 (FIG. 3). Similar discussion can be made with respect to the other shift arrows 78–79 and 86–87. As a result thereof, when the FIG. 4*a* odd-field display frame 70 is overlapped with the FIG. 4*b* even-field display frame 80, the result is the FIG. 4*c* interlaced display frame 89 not having overlapped odd-field/even-field scan lines, and thus not experiencing a resolution degradation problem. More particularly, the interlaced display frame 89 has the following arrangement of scan lines from top to bottom: overlapped odd-field lines 71, 72 (both black), overlapped even-field lines 81, 82 (both white), overlapped odd-field lines 73, 74 (both black), overlapped even-field lines 83, 84 (both white), overlapped odd-field lines 75, 76 (both black), even-field line 85 (white), i.e., the original and expected exemplary (alternating) black-white-black-white . . . pattern is maintained.

One technique for overcoming the resolution degradation problem is disclosed in Japanese Patent Publication No. 6-14689. However, such technique suffers from at least two deficiencies. More particularly, first, in a case where a double-speed signal converted in advance is inputted from outside an apparatus (e.g., via an external input terminal), the arrangement disclosed in such publication cannot distinguish which raster scanning line must be vertically shifted in order to avoid the resolution degradation problem in an overlaying scan, i.e., all incoming scan lines appear the same to the apparatus as there is no information to distinguish shift scan lines from non-shift scan lines. Therefore, in a case where a double-speed signal converted in advance is inputted into the apparatus of such technique, necessary and proper vertical shifting cannot be determined or performed, and therefore vertical resolution of a corresponding image becomes degraded. A second deficiency, while the above technique may work for a situation when one scanning speed is used consistently across an entire screen (FIG. 9), such background approach is disadvantageous when scanning speed and thus selective vertical shifting must be changed from area-to-area within a screen (i.e., intra-screen), for example, in a picture-in-picture operational mode such as illustrated in FIG. 9 which displays a PC display signal in an image b screen portion and an NTSC signal in an image a screen portion. More particularly, when an overlaying scan (including vertical shifting) is executed for an entire screen, for example, in a case where a signal of the image that is indicated in FIG. 8 is attempted, the vertical resolution of a PC image (image b) declines as selected scanning lines thereof are vertically shifted causing resolution degradation and/or scrambling of the display lines. To the contrary, when an overlaying scan (including vertical shifting) is not executed, the vertical resolution of a double-speed NTSC image (image a) declines as the resolution degradation problem discussed above occurs. Again, there is no information/arrangement to distinguish which portions of the picture-in-picture screen are speed-changed and/or need vertical scan-line shifting.

SUMMARY OF THE INVENTION

It is an object of the present invention to solve such problems and to provide an image display apparatus capable of preventing the vertical resolution from being deteriorated when video signals possibly requiring vertical line-shifting are inputted from an external source.

It is a further object of the present invention to provide an image display apparatus capable of preventing the vertical resolution from being deteriorated when images of video signals having different systems are displayed within different areas on a same screen.

In order to accomplish the above-described object, according to the present invention, when image signals are displayed as shown in FIG. 8, a signal for distinguishing the scanning portion in the image a from the scanning portion in the image b is caused to be generated on a personal computer side. On the basis of this discrimination signal, a display side can effect supplementary (i.e., vertical) deflection scanning in the image a portion in correspondence with an interlaced scanning area to thereby avoid the resolution degradation problem. Also, even in a case where the image c in FIG. 9 is displayed, it is possible to constitute a display system excellent in the resolution performance by transmitting a discrimination signal from the personal computer side to a display side.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWINGS

The following represents brief descriptions of the drawings, wherein:

FIG. 3 is a view showing operation waveforms of the embodiment shown in FIG. 2;

FIG. 11 is a block diagram showing an embodiment of a double-speed processing circuit, output switching circuit, discrimination circuit and addition circuit, useable with the FIG. 8 embodiment.

FIG. 13 illustrates a flowchart of a discrimination detection operation performed by a FIG. 8 discrimination and detection circuit 104.

DETAILED DESCRIPTION OF THE PREFERRED EMBODIMENTS OF THE INVENTION

Figure 1:
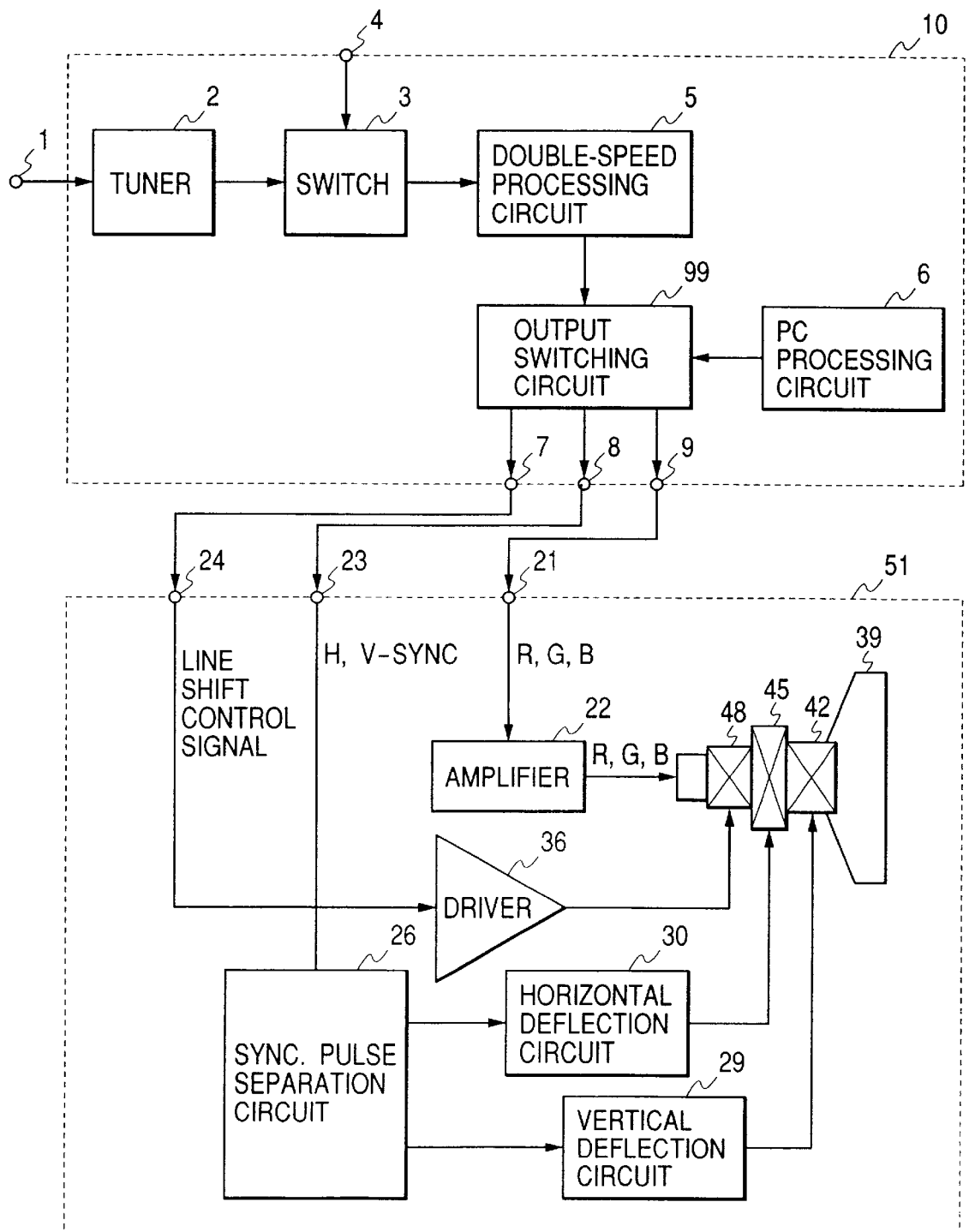
FIG. 1 is a block diagram showing a first embodiment of an image display system according to the present invention.

Before beginning a detailed description of the subject invention, mention of the following is in order. More particularly, when appropriate, like reference numerals and characters are used to designate identical, corresponding or similar components in differing figure drawings.

Hereinafter, description will be made of embodiments according to the present invention with reference to the drawings. More specifically, FIG. 1 is a block diagram showing a first embodiment of an image display system according to the present invention, i.e., as applied to a cathode ray tube (CRT) display device. More particularly, the FIG. 1 embodiment is composed of a device 10 including a display signal generator such as a personal computer, and a device 51 including a display unit. The device 10 preferably includes an antenna input terminal 1, a tuner 2, a switch 3, an external video input terminal 4, a double-speed processing circuit 5, a PC processing circuit 6, an output switching circuit 99, a discrimination signal output terminal 7, a synchronizing signal output terminal 8, and a RGB signal output terminal 9. The device 51 preferably includes an external RGB input terminal 21, an external synchronizing signal input terminal 23, a discrimination signal input terminal 24, a synchronizing pulse separation circuit 26, a vertical deflection circuit 29, a horizontal deflection circuit 30, driving circuit 36, CRT display tube 39, vertical deflection coil 42, horizontal deflection coil 45, and sub-vertical deflection coil 48. (Although not shown, the FIG. 1 device 51 can further include a sub-vertical convergence correction waveform generator circuit which generates a sub-vertical convergence correction waveform normally applied to the sub-vertical deflection coil 48, i.e., if included, such correction waveform would be summed with the line shift control signal from terminal 24, and the sum would be applied to the sub-vertical deflection coil 48.)

The R,G,B signal is transmitted from the RGB signal output terminal 9 (of device 10) to the external RGB input terminal 21 (of device 51) through use of any suitable approach (e.g., via serial transmission along a single cable, via parallel transmission along multiple cables, radio transmission/reception, infrared transmission/reception, etc.). Likewise statements can be made concerning transmission of the H-,V-sync signals from the synchronizing signal output terminal 8 to the external synchronizing signal input terminal 23, and concerning transmission of the discrimination signal from the discrimination signal output terminal 7 to the discrimination signal input terminal 24.

Turning now to discussion of one of the important features of the present invention, in order to inform the display apparatus 51 when a changed speed display signal is being provided and when vertical line shifting must be performed, the FIG. 1 arrangement includes the discrimination signal in the form of a line shift control signal which is output from the discrimination signal output terminal 7 of the device 10, and received at the discrimination signal input terminal 24 of the device 51, to be applied to the sub-vertical deflection coil 48. More particularly, the line shift control signal controls sub-vertical shifting of appropriate interlaced scan lines at appropriate timings, so as to avoid resolution degradation as discussed previously. Through use of the line shift control signal, a device 51 can now know when externally generated display signals require shifting, and also, shifting can be selectively performed for intra-frame sub-areas (i.e., shifting with respect to any sub-area of a display screen so as to maintain proper resolution of both NTSC signals and PC signals in a picture-in-picture display).

Figure 4A:
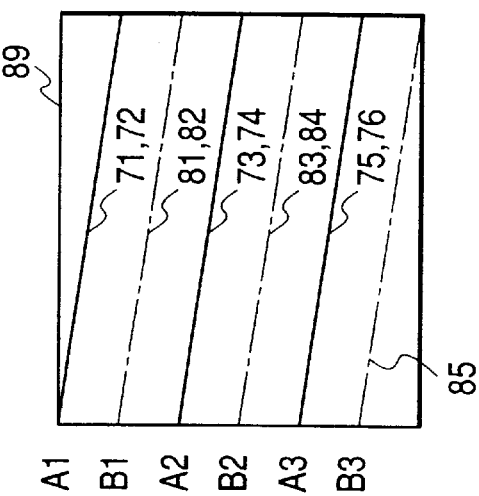
FIGS. 4*a*–4*c* are views showing a scanning operation in the embodiment shown in FIGS. 1 and 2.
Figure 7:
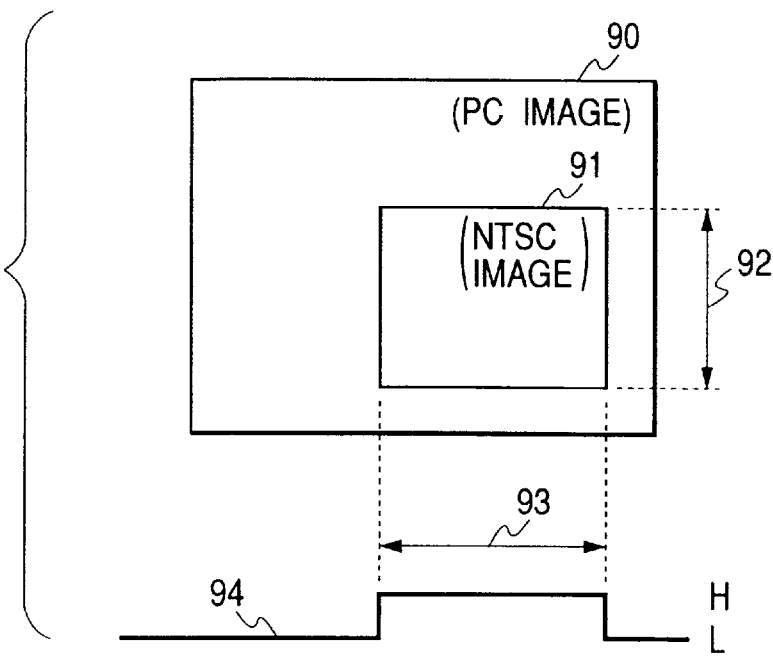
FIG. 7 is a view showing a scanning operation with respect to the embodiment shown in FIG. 6.
Figure 9:
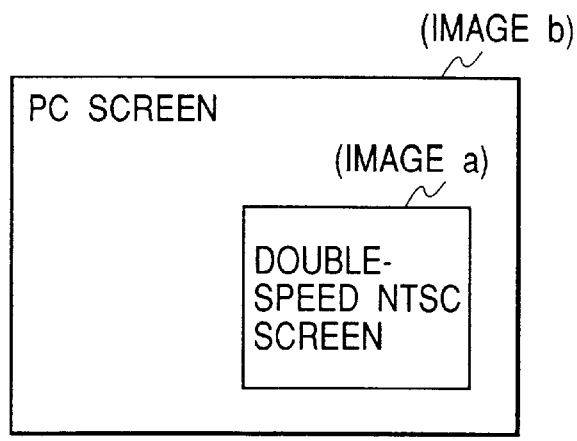
FIG. 9 is a view showing a display example for an image display apparatus for background discussion.
Figure 10:
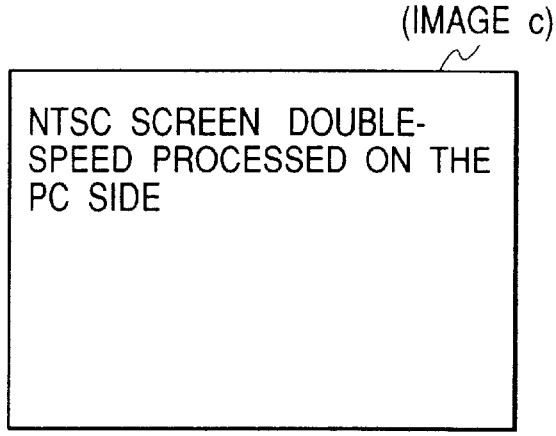
FIG. 10 is a view showing another display example for an image display apparatus, again for background discussion.

More particularly, for example, if an NTSC image is to be displayed within a picture-in-picture block 91 (FIG. 7), the line shift control signal (i.e., to directly perform vertical shifting and/or authorize a specific circuit to perform vertical shifting shown by arrow 77 of FIG. 4a) would be supplied only during a period within both the FIG. 7 display ranges 92, 93 using the high-speed output switching circuit 99, and a line shift control signal preventing or inhibiting vertical shifting would be supplied for other FIG. 7 display ranges. More particularly, the line shift control signal can be supplied as waveform 64 (FIG. 3) within display ranges 92, 93 to directly perform vertical shifting, or alternatively, can be some type of predetermined signal (e.g., a logical "high" signal) which authorizes a specific circuit (e.g., within the display device 51) to generate waveform 64 (FIG. 3).

Figure 2:
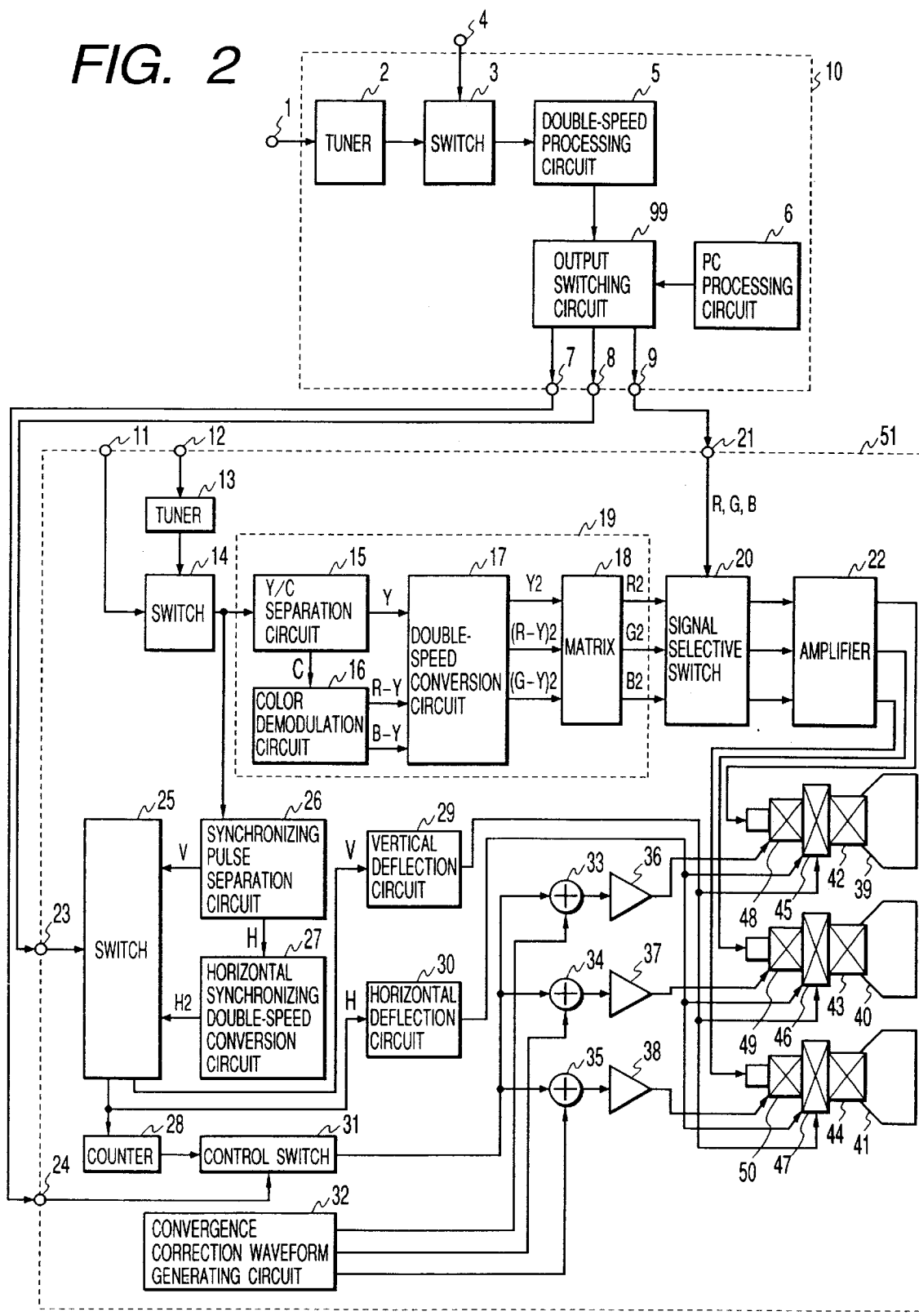
FIG. 2 is a block diagram showing a another embodiment of an image display system according to the present invention.

Turning next to description of another embodiment, FIG. 2 shows an arrangement including a device 10 similar to that of FIG. 1, but utilizing a projection-type device 51 incorporating Braun tubes and an independent tuning circuit. As to construction, the FIG. 2 device 51 includes an external video input terminal 11, an antenna input terminal 12, a tuner 13, a switch 14, a double-speed processing circuit 19, a signal selective switch 20, an external RGB input terminal 21, an amplifier 22, an external synchronizing signal input terminal 23, a discrimination signal input terminal 24, a synchronizing signal selective switch 25, a synchronizing pulse separation circuit 26, a horizontal synchronizing double-speed conversion circuit 27, a counter 28, a vertical deflection circuit 29, a horizontal deflection circuit 30, a control switch 31, a convergence correction waveform generating circuit 32, adders 33 to 35, driving circuits 36 to 38, R G B Braun tubes 39 to 41, vertical deflection coils 42 to 44, horizontal deflection coils 45 to 47, and convergence coils 48 to 50. In this respect, the double-speed processing circuit 19 consists of a Y/C separation circuit 15, a color demodulation circuit 16, a double-speed conversion circuit 17 and a matrix circuit 18.

Figure 4B:
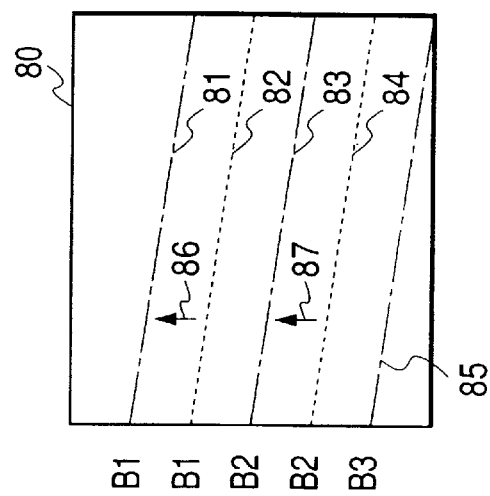

First, a stand-alone operation of the device 51 will be described using FIGS. 3 and 4, and next a combined operation when the device 10 and the device 51 operate together will be described using FIGS. 5 and 6. More particularly, turning first to the stand-alone operation, in the device 51, a RF signal inputted from the antenna terminal 12 is converted into a video signal (such as, for example, NTSC signal) by the tuner 13. Either the tuner-supplied video signal or a video signal inputted through the external input terminal 11 is selected by the switch 14 to be supplied to the Y/C separation circuit 15 and the synchronizing pulse separation circuit 26. The color (C) signal after the Y/C separation is separated into two color difference signals R-Y and B-Y by the color demodulation circuit 16. These color difference signals and a brightness (Y) signal are converted to double-speed signals whose horizontal scanning period has been compressed to ½ and then are outputted twice by the double-speed conversion circuit 17.

To take the brightness (Y) signal as an example, a waveform 60 in FIG. 3 (when used for purposes of discussion of the embodiment of FIG. 2) indicates an input brightness signal input into the double-speed conversion circuit 17, and a double-speed brightness signal (Y2) of a waveform 62 is outputted from the double-speed conversion circuit 17. The color difference signals are also converted into double-speed color difference signals ((R-Y)2, (B-Y)2) similarly, and the Y2, (R-Y)2, (B-Y)2 signals are then treated within the matrix circuit 18 to obtain R2, G2, B2 signals. The R2, G2, B2 signals are supplied through the signal selective switch 20, to the amplifier 22, and the passed signals are applied to the cathode terminals of the Braun tubes 39 to 41.

On the other hand, a horizontal synchronizing signal (H) obtained from the synchronizing pulse separation circuit 26 is converted into a horizontal synchronizing signal (H2) with double period in the double-speed conversion circuit 27. In FIG. 3 (when used for purposes of discussion of the embodiment of FIG. 2), the waveform 61 indicates the separated horizontal synchronizing signal and the waveform 63 indicates a double-period horizontal synchronizing signal. The double-period horizontal synchronizing signal is supplied together with the vertical synchronizing signal (V) to the horizontal deflection circuit 30 and the vertical deflection circuit 29, respectively, through the synchronizing signal selective switch 25 to then drive the horizontal deflection coils 45 to 47 and the vertical deflection coils 42 to 44, respectively. When the independent internal tuning arrangement of the FIG. 2 device 51 is being used for supplying display signals (as opposed to any device 10 arrangement), the selective switch 25 normally passes the double-period horizontal synchronizing signal (H2) and vertical synchronizing signal (V) supplied from the synchronizing pulse separation circuit 26 and the horizontal synchronizing double speed conversion circuit 27 (as opposed to any synchronizing signals supplied from the device 10 via the external synchronizing signal input terminal 23). In using the above-discussed and FIG. 2 illustrated arrangement, the odd-frame and even-frame scan lines are double scanned as discussed previously with respect to FIGS. 4a–4b.

To avoid resolution distortion, the FIG. 2 device 51 itself contains an independent arrangement (from that contained in device 10) for generating a line shift control signal 64 to effecting the vertical shifting 77–79 and 86–87 discussed with respect to FIGS. 3 and 4a–4c. More particularly, the double-speed horizontal synchronizing signal (H2) is applied to and used in the counter 28 to generate a square wave with double period as shown as waveform 64 (FIG. 3). When the independent internal tuning arrangement of the FIG. 2 device 51 is being used (as opposed to any device 10 arrangement), the control switch 31 normally passes the line shift control signal 64 generated by the counter 28. More particularly, a gating or passing of the counter 28 signals through the control switch can be can be responsive to a discrimination signal of a predetermined level (e.g., logical high "H" level) supplied via the discrimination signal input terminal to cause the control switch 31 to normally gate (i.e., pass) the counter 28 output. (As an alternative arrangement, one input to the control switch 31 can be line shift control signal 64 generated by the counter 38 within the device 51, while another input can be an independent line shift control signal 64 generated within and transmitted separately from the device 10, and the control switch 31 can be arranged to selectively gate either line shift control signal via a separate control line (not shown), i.e., depending upon which of the device 10 or 51 was being used for supplying the display signals.)

Figure 4C:
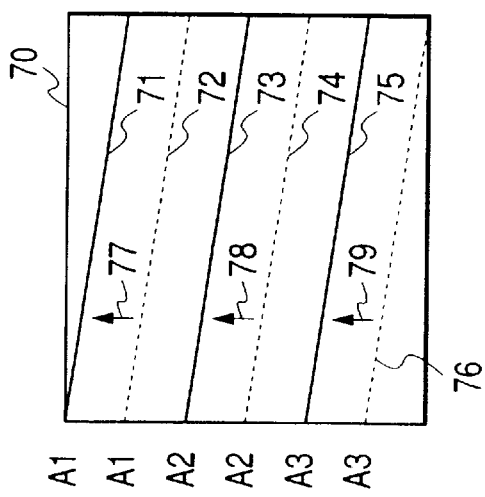

The control switch 31 output is supplied to each of the adders 33–35, wherein signals from the convergence correction waveform generating circuit 32 are added thereto in the arrangement illustrated, and the added outputs from the adders 33 to 35 are applied to the convergence coils 48 to 50 through the driving circuits 36 to 38. As a result, the scanning lines 72, 74 and 76, for example, shown in FIG. 4(a) are very slightly deflected in the vertical direction to move in vectored directions 77 to 79, thus making it possible to lay the scanning lines of Ai on top of one another. Similarly, in FIG. 4b, the scanning lines 82 and 84 move in vectored directions 86 and 87 by means of a very slight deflection operation to be laid on top of the scanning lines 81 and 83, respectively. FIG. 4(c) shows a case where the even and odd scanning lines are overlappingly displayed, and the scanning line structure corresponding to the interlace display for NTSC and the like can be faithfully reproduced, i.e., without resolution distortion. Accordingly the image can be reproduced without impairing the image quality of video signals such as NTSC signals.

Next, a combined operation of the FIG. 2 device 10 and the device 51 operating together will be described. More particularly, the FIG. 2 device 10 is representative of a personal computer (PC) mounted with a video signal processing circuit for NTSC signals and the like. More particularly, a RF signal inputted from the antenna input terminal 1 is converted into a video signal by the tuner 2 (e.g., provided as a television tuner card within the PC), and either the tuner-supplied signal or a signal inputted from the external video terminal 4 is selected to be passed by the switch 3. From such passed signal, a double-speed processing circuit 5 generates a primary signal and a synchronizing signal whose horizontal scanning periods have been compressed into ½, i.e., doubled signals. This is the same function as the above-described device 51's double-speed processing circuit 19 and the double-speed conversion circuit 27 for synchronizing signals. When the double-speed processing circuit 5 output is to be transmitted from the device 10 to the device 51 for display, the output switching circuit 99 outputs a double-speed RGB signal through the RGB signal output terminal 9, a double-speed synchronizing signal through the synchronizing signal output terminal 8, and a discrimination signal through the discrimination signal output terminal 7.

During operations when the device 10 is used to supply display signals, horizontal and vertical synchronizing components of the double-speed synchronizing signal received at the external synchronizing signal input terminal 23 are passed through the selective switch 25 to the counter 28, vertical deflection circuit 29 and horizontal deflection circuit 30 (i.e., as opposed to the double-period horizontal synchronizing signal (H2) and vertical synchronizing signal (V) supplied from the synchronizing pulse separation circuit 26 and the horizontal synchronizing double speed conversion circuit 27, respectively). More particularly, the selective switch 25 can be constructed to be responsive to the presence or absence of the double-speed synchronizing signal received at the external synchronizing signal input terminal 23, i.e., to normally pass the double-period horizontal synchronizing signal (H2) and vertical synchronizing signal (V) supplied from the synchronizing pulse separation circuit 26 and the horizontal synchronizing double speed conversion circuit 27, respectively, during times when there is no double-speed synchronizing signal received at the external synchronizing signal input terminal 23. (As an alternative arrangement, the selective switch can be constructed to have a separate control line input (not shown) to control a switching thereof, i.e., depending upon which of the device 10 or 51 was being used for supplying the display signals.)

The discrimination (i.e., control) signal to the discrimination signal output terminal 7 is set, for example, to a "H" level, and then transmitted to the discrimination signal input terminal 24 when the operation of the control switch 31 is to gate (i.e., pass) the output signal from the counter 28 to the adders 33 to 35. In contrast, when the discrimination signal input terminal 24 is at a "L" level or open and such signal is applied to the control switch 31, the output of the counter 28 is prohibited from effecting vertical shifting, i.e., is not passed or gated through the control switch 31.

Further during operations when the device 10 is used to supply display signals, the R,G,B signals received at external RGB input terminal 21 (i.e., as opposed to the R2, G2, B2 signals from the matrix circuit 18) are passed through the signal selective switch 20 to the amplifier 22. More particularly, the signal selective switch 20 can be constructed to be responsive to the presence or absence of R,G,B signals received at external RGB input terminal 21, i.e., to normally pass the R2, G2, B2 signals from the matrix circuit 18 during times when there are no R,G,B signals received at external RGB input terminal 21. (As an alternative arrangement, the selective switch can be constructed to have a separate control line input (not shown) to control a switching thereof, i.e., depending upon which of the device 10 or 51 was being used for supplying the display signals.)

When the selective switches 20 and 25 in the device 51 select the external video signal for passage therethrough, the video signal can be faithfully displayed as shown in FIG. 4(c). On the other hand, when the output switching circuit 99 selects a PC processing circuit 6 for providing a display, a RGB signal from PC processing circuit 6 is outputted through the RGB signal output terminal 9, and a synchronizing signal from the PC is outputted through the synchronizing signal output terminal 8. By setting the control signal to the discrimination signal output terminal 7 to the "L" level during display output from the PC processing circuit 6, it is possible to inhibit any vertical shifting and to display the image faithfully (i.e., without resolution degradation) because the scanning line structure of the FIG. 5 sequential scanning of C1 to C8 is obtained (without causing vertical shifting).

Figure 5:
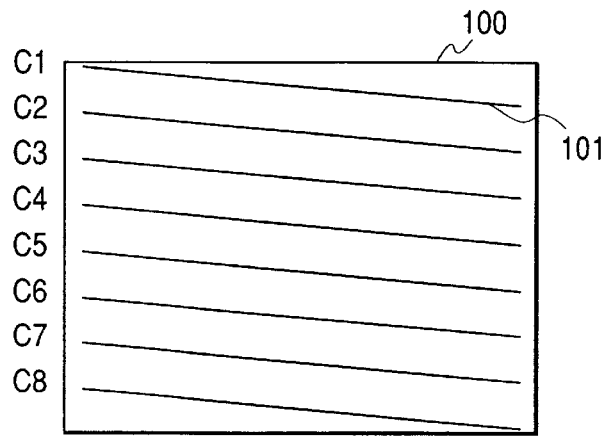
FIG. 5 is a view showing non-interlaced scanning lines of the embodiment shown in FIGS. 1 and 2.

Even when the device 51 it is connected to a personal computer having no discrimination signal output terminal 7 or the like, the device 51 is capable of faithfully displaying the PC processing circuit 6's sequential scanning line structure shown in FIG. 5 without vertical shifting. More particularly, with such a personal computer having no discrimination signal output terminal 7, the discrimination signal input terminal 24 of the device 51 is left opened (i.e., unconnected), and an absence of a high level signal on the discrimination signal input terminal 24 will thus prohibit the control switch 31 from passing the output of the counter 28.

Figure 6:
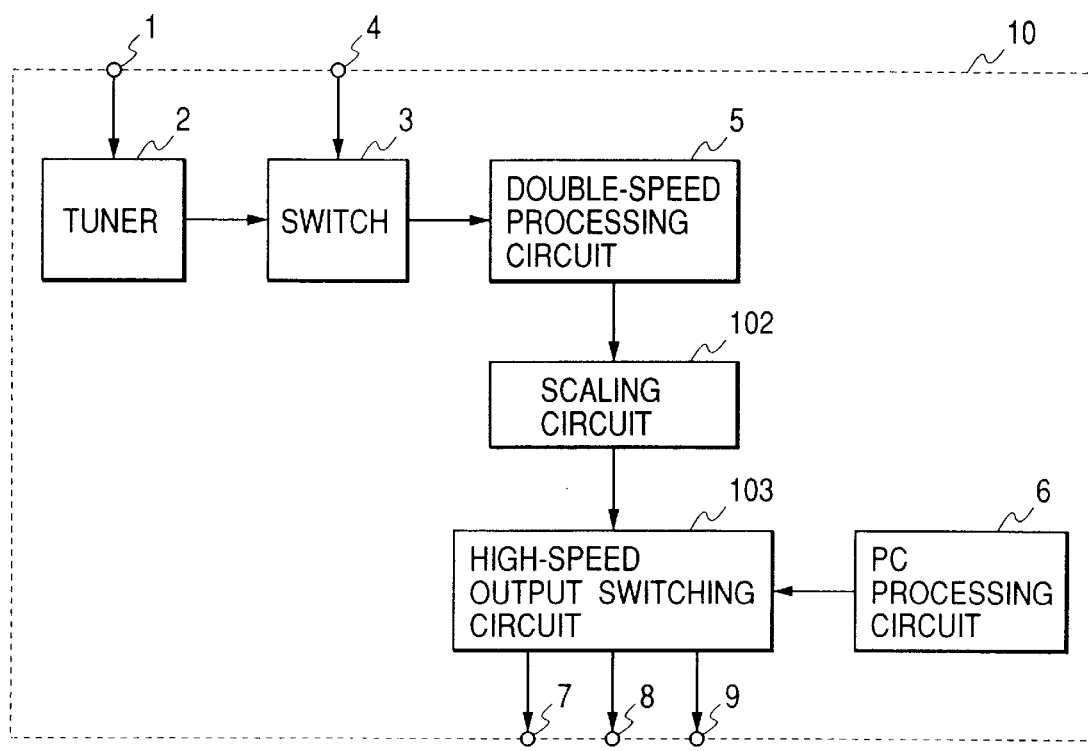
FIG. 6 is a block diagram showing an alternative embodiment of one of the devices of FIGS. 1 and 2.

FIG. 6 is a block diagram showing an alternative embodiment of the device 10 of FIGS. 1 and 2, in which components corresponding to components in previous FIGS. 1 and 2 are referenced by the same reference marks, and wherein a scaling circuit 102 has been added. More particularly, this embodiment is capable of displaying a scaled or resized NTSC image within the PC image display of the screen 90 as shown in FIG. 7. More specifically, since a sub-block 91 of FIG. 7 is smaller in vertical and horizontal size than an entire screen area, an NTSC image meant for entire screen display must be resized to the size of the block 91 if the entire NTSC image is to be displayed within the smaller block 91. Hereinafter, the operation of select portions of such differing embodiment will be described.

A RF signal inputted from the antenna input terminal 1 is converted into a video signal by the tuner 2, and the switch 3 is used to selectively pass either the tuner-supplied signal or an externally-supplied video signal from the external video input terminal 4, to the double-speed processing circuit 5. In the double-speed processing circuit 5 (having the same functions as double-speed processing circuits 19 and 27), a primary signal and a synchronizing signal whose horizontal scanning periods have been compressed into ½ are obtained. The output signals from the double-speed processing circuit 5 are converted within a scaling circuit 102 so as to reduce the horizontal and vertical display size of the image. Any well know scaling approach can be implemented within the scaling circuit 102, for example, the scaling arrangements of U.S. Pat. No. 5,534,934 (the teachings of which are incorporated herein by reference) are applicable.

The scaled double-speed RGB signal is selected and output only during a period corresponding to the display range 92, 93 shown in FIG. 7 using a high-speed output switching circuit 103, and a signal from the PC processing circuit 6 is selected and output in the other periods. At this time, as the output signal to the discrimination signal output terminal 7, a waveform 94 (FIG. 7) which becomes a "H" level during the period 93 is outputted in the vertical display period 92. As a result, activation/inhibition of vertical shifting is appropriately controlled in both a PC signal display and a NTSC signal display, and thus image quality is hardly deteriorated.

As another option applicable to the present invention, if the range indicated by the display range 92 93 is very small, it may become necessary to prohibit very slight vertical deflection following the waveform 94. In this case, the structure of the device 51 and/or control switch 31 may be arranged so as to allow a user to selectively cancel vertical shifting correction. Further, a user may selectively cancel vertical shifting correction in cases where resolution distortion is minor or irrelevant to a user's criteria.

In the embodiment described above, description has been made of the control method for the discrimination signal input terminal 24 in the device 51 by exemplifying a system using "H" and "L" levels. However, it is needless to say that design may be made such that there is provided a coder/decoder arrangement within the device 10 and device 51, for example, there may be a coder within the device 10 and may be a decoder circuit or the like between the discrimination signal input terminal 24 and the control switch 31 so as to decode a predetermined encoded signal transmitted from the device 10 to the device 51.

Figure 8:
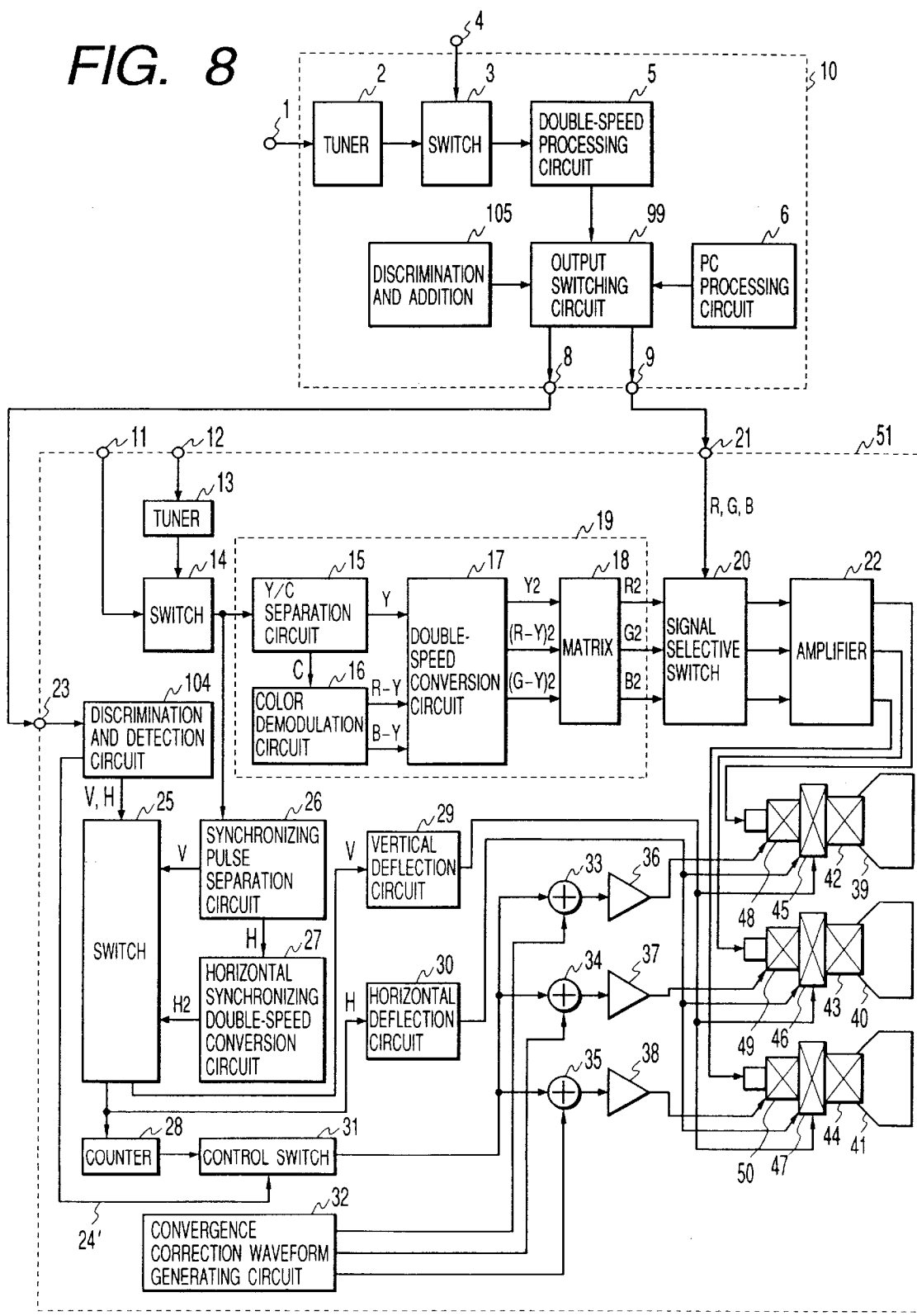
FIG. 8 is a block diagram showing yet another embodiment according to the present invention.

FIG. 8 is a block diagram showing a further embodiment of an image display apparatus according to the present invention, wherein again, components corresponding to components in FIGS. 1 and 2 are referenced by the same reference numerals, and redundant explanation thereof is omitted. FIG. 11 is a block diagram showing an embodiment of the double-speed processing circuit 5, the output switching circuit 99 and the discrimination and addition 105 in the FIG. 8 device 10. Also, FIG. 12 shows operation waveforms for the discrimination and addition system in this embodiment.

Figure 12:
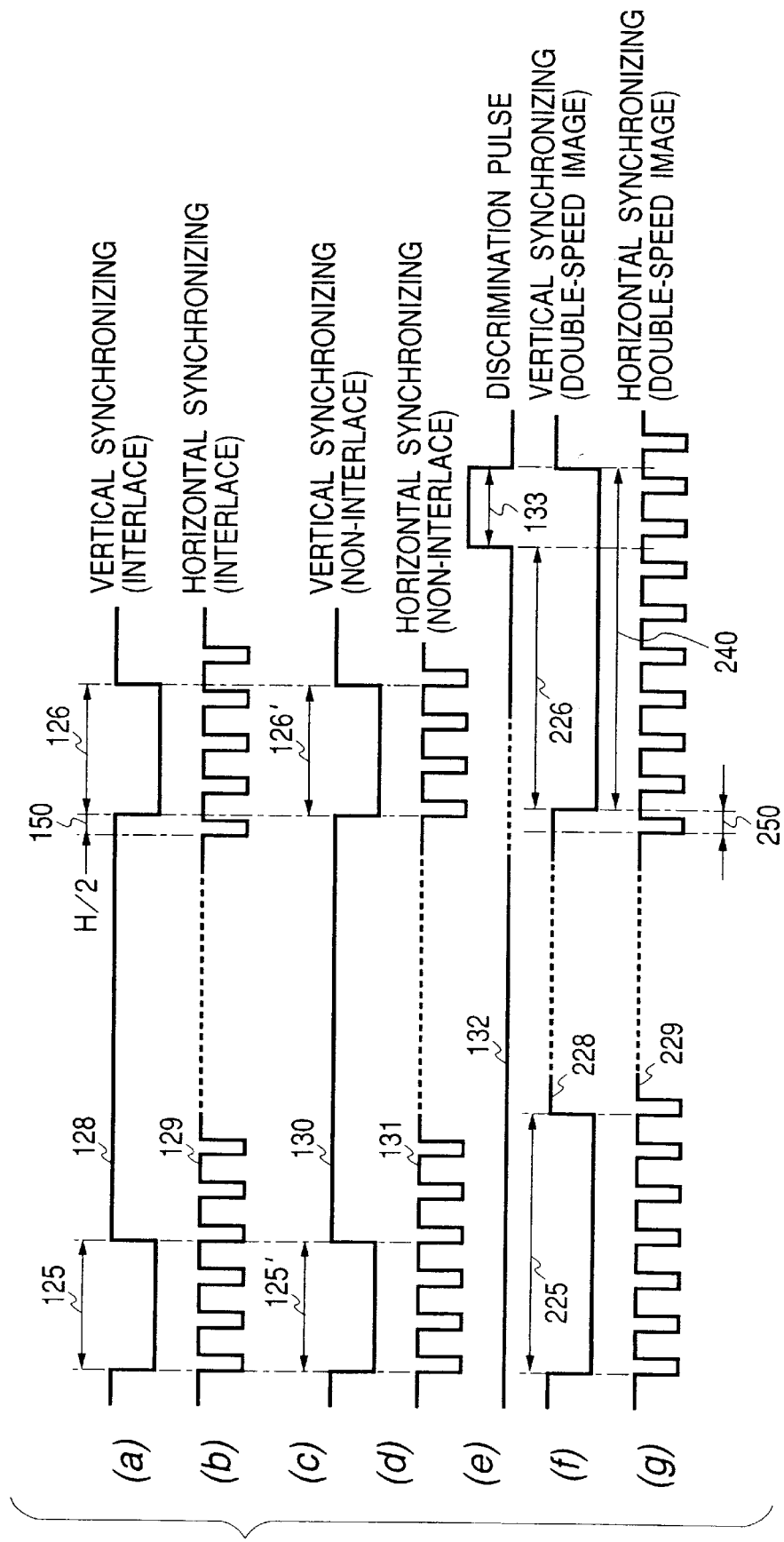
FIG. 12 illustrates views showing signal operations of the embodiment shown in FIG. 11.

Before discussion of the FIGS. 8 and 11–12 embodiment, background discussion of the following is in order. More specifically, in FIGS. 1–2, while usually each output from the synchronizing signal output terminal 8 and the RGB signal output terminal 9 is connected through single transmission paths (e.g., through single cables via serial transmission) and such transmission paths have been previously provided, many times it is difficult to provide a new transmission path (e.g., cable) for transmitting a signal from the discrimination signal output terminal 7, for example, in a case where a facility (e.g., building) walls, floors, etc. have been pre-wired and supplemental wiring thereof would be burdensome and/or impossible. The FIGS. 8, 11 embodiment eliminates this difficulty and allows the present invention to be practiced using only a preexisting synchronizing signal wiring or transmission path, i.e., without the addition of a separate further discrimination signal transmission wire or path between the device 10 and device 51.

More particularly, the FIGS. 8 and 11–12 embodiment provides at least three signal features which can be used to designate and/or determine a discrimination signal, i.e., first, synchronizing signals which are in-phase for non-interlace signals verses periodically out-of-phase for interlace signals; second, synchronizing signals having a consistent number of horizontal synchronizing pulses occurring during sequential vertical synchronizing pulses for non-interlace signals verses an alternating number during sequential vertical synchronizing pulses for interlace signals; and, third, synchronizing signals having consistent pulse lengths for non-interlace signals and alternating pulse lengths for interlace signals. Such three signal features are discussed in greater detail as follows:

More specifically, turning to the first and second signal features, the FIGS. 8, 11 arrangement has a first non-interlace/interlace distinguishing feature in that, when a non-interlace signal is being used for a display signal, a leading edge (FIG. 12*c*) of vertical synchronizing pluses 125', 126' (appearing at input 117 from the PC processing circuit 6; FIG. 11) consistently phase match a leading edge of ones (FIG. 12*d*) of the horizontal synchronizing signals 131 (appearing at input 117 from the PC processing circuit 6; FIG. 11), and a same number N=3 high "H" level horizontal synchronizing pulses consistently occur during each sequential low "L" level vertical synchronizing pulse. In contrast, when an interlace signal is being used for a display signal: a leading edge of odd-numbered vertical synchronizing pluses 125, . . . (FIG. 12*a*) output from the synchronizing pulse separator 107 consistently phase match a leading edge of ones of the horizontal synchronizing signals 129 (FIG. 12*b*) and a same number of N=3 high "H" level horizontal synchronizing pulses occur during each odd-numbered vertical synchronizing pulse; and, a leading edge of each even-numbered vertical synchronizing pulse 126 (FIG. 12*a*) is phase-shifted from a leading edge of ones of the horizontal synchronizing pulses 129 and a same number of N+1=4 high "H" level horizontal synchronizing pulses occur during each odd-numbered vertical synchronizing pulse. Accordingly, for an interlace signal, a number of high "H" level horizontal synchronizing pulses occurring during sequential low "L" level vertical synchronizing pulses alternates with each alternating low "L" level vertical synchronizing pulse, i.e., alternates between N=3 and N+1=4.

The above-two signal differences can, in essence, be used as discrimination signals by the FIG. 8 discrimination and detection circuit 104 monitoring a phase-matching between the vertical synchronizing signal and the horizontal synchronizing signal (providing the phase relationship is preserved during transmission), or by monitoring a stability/instability in a number of high "H" level horizontal synchronizing pulses occurring during sequential low "L" level vertical synchronizing pulses. For example, in the discrimination and detection circuit 104, the horizontal synchronizing signals for each vertical period are counted to distinguish whether it is always "a constant value" or "repetition of a constant value and the constant value+1", or "repetition of a constant value and the constant value+a value of 2 or more". In the case of the "repetition of a constant value and the constant value+a value", a desired operation can be realized by controlling the control switch 31. More particularly, FIG. 13 illustrates a flowchart of a discrimination detection operation performed by a FIG. 8 discrimination and detection circuit 104 (implemented in a form of a microprocessor). A step 1310 is used to detect whether a vertical sync signal is out-of-phase with a horizontal signal, whereas an alternative or complementary step 1320 is used to detect whether a horizontal sync pulse count within sequential vertical sync pulses alternates between N and N+1. If yes, an interlaced signal is deemed detected and a discrimination signal is output by the circuit 104 on the discrimination signal line 24'.

As to a third signal features, the inventors have preferentially found that the discrimination pulse can be combined with, i.e., added to lengthen, a vertical synchronizing pulse so as to allow transmission of the discrimination pulse together with the vertical synchronizing pulse in a same transmission channel. Such third approach is preferred over the first (phase detection) approach and second (pulse count) approach, in that a lengthened vertical synchronizing pulse is more easily and/or accurately detected after transmission, as opposed to phase differences and pulse counts which may become distorted during transmission. Discussion now continues with explanation of the combination (i.e., addition) of the discrimination pulse to the vertical synchronizing pulse.

More specifically, as discussed previously, when an interlace signal is being used for a display signal: a leading edge of odd-numbered vertical synchronizing pluses 125, . . . (FIG. 12*a*) output from the synchronizing pulse separator 107 consistently phase match a leading edge of ones of the horizontal synchronizing signals 129 (FIG. 12*b*) and a same number of N=3 high "H" level horizontal synchronizing pulses occur during each odd-numbered vertical synchronizing pulse; and, a leading edge of each even-numbered vertical synchronizing pulse 126 (FIG. 12*a*) is phase-shifted from a leading edge of ones of the horizontal synchronizing pulses 129 and a same number of N+1=4 high "H" level horizontal synchronizing pulses occur during each odd-numbered vertical synchronizing pulse. Such features persist (with pulse count adjustment due to doubling) when the vertical synchronizing signal 128 (FIG. 12*a*) is doubled to the modified vertical synchronizing signal 135 (FIG. 12*g*) for effecting a double-speed image.

More specifically, a leading edge of odd-numbered vertical synchronizing pluses 225, . . . (FIG. 12*f*) output from the adder 114 consistently phase match a leading edge of ones of the horizontal synchronizing signals 229 (FIG. 12*g*) and a same number of N=6 high "H" level horizontal synchronizing pulses occur during each odd-numbered vertical synchronizing pulse; and, a leading edge of each even-numbered vertical synchronizing pulse portion 226 (FIG. 12*f*) is phase-shifted from a leading edge of ones of the horizontal synchronizing pulses 229 and a same number of N+1=7 high "H" level horizontal synchronizing pulses occur during each odd-numbered vertical synchronizing pulse portion 226. The FIG. 11 discrimination pulse generating circuit 113 generates a discrimination pulse 133 (FIG. 12*e*) at a predetermined timing with respect to the even-numbered vertical synchronizing pulse portion 226 (FIG. 12*f*), and the adder 114 combines (or adds) the pulse portion 226 and the discrimination pulse 133 to result in a lengthened vertical synchronizing pulse 240.

The above-discussed difference can, in essence, be used as a discrimination signal by the FIG. 8 discrimination and detection circuit 104 monitoring for a lengthened vertical synchronizing signal. More particularly, returning to the FIG. 13 flowchart, the FIG. 8 discrimination and detection circuit 104 (implemented in a form of a microprocessor) uses a step 1330 to detect whether lengthened vertical sync pulses are occurring. If yes, an interlaced signal is deemed detected and a discrimination signal is output by the circuit 104 on the discrimination signal line 24'. While the FIG. 13 flowchart illustrates and describes the FIG. 8 discrimination and detection circuit 104 (implemented in a form of a microprocessor) as performing three parallel detection steps 1310, 1320, 1330, the circuit 104 can actually be arranged/ programmed to perform any selected fewer number of detection steps. By using the discrimination and detection circuit 104 to detect/extract the discrimination signal and apply the same to the control switch 31, it is possible to utilize only the preexisting synchronizing signal wiring or transmission path to effect discrimination signalling, and to switch the image between that of FIG. 4(c) and FIG. 5 and vice versa.

Turning now to more detailed discussions concerning FIGS. 8 and 11–12, circuit 29 is constructed such that a vertical deflection operation thereof is effected from a leading edge trigger of the synchronizing pulse separation circuit 26, and the discrimination and detection circuit 104 is provided between the external synchronizing signal input terminal 23 and the switch 25. A composite video signal inputted from the input terminal 106 is supplied to the synchronizing pulse separation circuit 107. The video signal separated therein is supplied to an analog-to-digital converter 108, wherein an output of the analog-to-digital converter 108 is in turn supplied to a 1H line memory 110. Also, a horizontal synchronizing signal separated and outputted from the synchronizing pulse separation circuit 107 is supplied to a PLL circuit 109 which then generates a clock signal (line lock clock) locked by the synchronizing signal. This line lock clock is set so that, for example, 910 clock pulses define one horizontal period. The PLL circuit 109 also generates double line lock clocks so that, for example, 1,820 clock pulses thereof define one horizontal period.

A write operation is performed on the 1H line memory 110 using the (910 clock pulse per period) line lock clock, and then the 1H line memory 110 is read twice using the (1,820 clock pulse per period) double line lock clock. The read output is passed through a digital-to-analog converter 111 to obtain a double-speed video signal (waveform 62 in FIG. 3). Also, the double line lock clock is counted 910 times in the PLL circuit 109 to thereby obtain a double-speed horizontal synchronizing signal H2. The double-speed horizontal synchronizing signal H2 is applied to a frequency divider 112 to obtain a deflection control signal (corresponding to the waveform 64 in FIG. 3) for being outputted through the output terminal 120, and the frequency divider 112 is reset at a vertical period using a vertical synchronizing signal applied thereto.

The double-speed video signal and double-speed horizontal synchronizing signal are selected over the signals on the external image input terminal 115 and the external horizontal synchronizing input terminal 116, using switches 122 and 123, respectively, and thereafter, the selected signals are outputted through output terminals 118, 119, respectively. The switches 122–124 can be constructed to be responsive to the presence or absence of signals at inputs thereof to preferentially pass one or the other of the input signals, or alternatively, such switches 122–124 can be constructed to have a separate control line input (not shown) to control a switching thereof, i.e., depending upon which of the NTSC-supplying components or PC processing circuit 6 was being used for supplying the display signals.

The FIG. 11 switches 122 to 124 correspond to the FIG. 8 output switching circuit 99, and the FIG. 11 external terminals 115 to 117 receive output signals from the FIG. 8 PC processing circuit 6. The vertical synchronizing signal is outputted through the output terminal 121 through selection of the switch 124, i.e., after an output signal from a discrimination pulse generating circuit 113 is added by an adder 114.

In the embodiments described above, the description has been made generally taking a sequential scanning signal of horizontal frequency 31.5 kHz and vertical frequency 60 Hz as a PC signal, and an interlace scanning signal of horizontal frequency 15.75 kHz and vertical frequency 60 Hz of a NTSC system or the like as a signal to be double-speed processed, but the present invention can be also applied to any signal combinations. For example, NTSC, PAL and even PC signals are not limited to simple doubling, but can be increased to any other frequency. More particularly, such signals can be increased by integer multiples so as to match a much higher available raster scanning frequency of a display apparatus.

Turning now to a summary, according to the present invention, in the display of the first video signal and the second video signal, cost reduction can be achieved even if any signal is displayed because available deflection frequencies within the display unit can be set within a narrow range. Also, even when any of the first and second video signals is displayed, the image quality is not deteriorated at all because the order and the number of scanning lines can be maintained in the same conditions as the supply signal. More particularly, when a video signal is double-speed processed by the first device, a vertical slight deflection process is performed by the second device, and any slight deflection in the second device is controlled by the first device to thereby enable setting so as to always display images with excellent resolution. Also, according to the present invention when a projection display of CRT system is applied as the second device, a brightness saturation phenomenon of particularly blue fluorescent substance in the CRT can be lessened by scanning electron beams twice or more to constitute a lighter display.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention.

What is claimed is:

1. An image display system for selectively displaying a first image signal and a second image signal having different scanning frequencies, comprising:

a first image processor processing said first image signal of a first scanning frequency of a raster scanning system to a modified first image signal so as to change the frequency thereof substantially to correspond to a frequency of the second image signal;

a discrimination signal generator providing a discrimination signal indicative of said modified first image signal being provided; and a second image processor having a deflection control circuit which controls a raster scanning position of a scanning line, the deflection control circuit overlaying at least a first raster scanning line and a second raster scanning line which is adjacent to the first scanning line of said modified first image signal responsive to said discrimination signal.

2. An image display system as claimed in claim 1, wherein said first image processor, said discrimination signal generator and said second image processor are disposed in a same apparatus.

3. An image display system as claimed in claim 1, wherein said image display system further comprises:
   a sub-vertical convergence deflection coil;
   a convergence correction generating circuit for generating a convergence correction signal which is applied to said sub-vertical convergence deflection coil; and
   wherein said second image processor more particularly uses a line-shift signal applied to said sub-vertical convergence deflection coil for overlaying at least a first raster scanning line and a second raster scanning line of said modified first image signal responsive to said discrimination signal.

4. An image display system as claimed in claim 3, wherein said image display system further comprises:
   a line-shift signal generator for generating said line-shift signal responsive to said discrimination signal.

5. An image display system as claimed in claim 3, wherein said discrimination signal is more specifically supplied as said line-shift signal.

6. An image display system as claimed in claim 1, wherein said change of frequency by said first image processor is more specifically an increase in frequency to make a make a frequency of said modified first image signal correspond to a frequency of the second image signal.

7. An image display system as claimed in claim 1, wherein said change of frequency by said first image processor is more specifically a doubling in frequency to make a make a frequency of said modified first image signal correspond to a frequency of the second image signal.

8. An image display system as claimed in claim 1, wherein said change of frequency by said first image processor is more specifically an integer multiple increase in frequency to make a make a frequency of said modified first image signal correspond to a frequency of the second image signal.

9. An image display system for selectively displaying a first image signal and a second image signal having different scanning frequencies, comprising:
   a first image processor processing said first image signal of a first scanning frequency of a raster scanning system to a modified first image signal so as to change the frequency thereof substantially to correspond to a frequency of the second image signal;
   a discrimination signal generator providing a discrimination signal indicative of said modified first image signal being provided; and
   a second image processor overlaying at least a first raster scanning line and a second raster scanning line which is adjacent to the first scanning line of said modified first image signal responsive to said discrimination signal,
   wherein said first image processor and said discrimination signal generator are disposed in a first apparatus and said second image processor is disposed in a second apparatus, and wherein said discrimination signal is transmitted from said first apparatus to said second apparatus using a transmission channel provided in a form of at least one of a cable, an infrared transmission channel, and a radio transmission channel.

10. An image display system as claimed in claim 9, wherein said first apparatus is more specifically a personal computer (PC) and said first image signal is derived from one of an NTSC signal and a PAL signal, said second image signal is more specifically a PC image signal, and said second apparatus comprises a display device in a form of a cathode ray tube (CRT) device.

11. An image display system as claimed in claim 9, wherein said first apparatus is more specifically a personal computer (PC) and said first image signal is derived from one of an NTSC signal and a PAL signal, said second image signal is more specifically a PC image signal, and said second apparatus comprises a projection-type display device using at least one Braun tube device.

12. An image display system for selectively displaying a first image signal and a second image signal having different scanning frequencies, comprising:
   a first image processor processing said first image signal of a first scanning frequency of a raster scanning system to a modified first image signal so as to change the frequency thereof substantially to correspond to a frequency of the second image signal;
   a discrimination signal generator providing a discrimination signal indicative of said modified first image signal being provided; and
   a second image processor overlaying at least a first raster scanning line and a second raster scanning line which is adjacent to the first scanning line of said modified first image signal responsive to said discrimination signal,
   further including a sync signal generator generating a sync signal including at least one of a horizontal sync signal and a vertical sync signal, and wherein said first image processor, said discrimination signal generator and said sync signal generator are disposed in a first apparatus and said second image processor is disposed in a second apparatus, and wherein said discrimination signal and said sync signal are transmitted from said first apparatus to said second apparatus using a common transmission channel.

13. An image display system for selectively displaying a first image signal and a second image signal having different scanning frequencies, comprising:
   a first image processor processing said first image signal of a first scanning frequency of a raster scanning system to a modified first image signal so as to change the frequency thereof substantially to correspond to a frequency of the second image signal;
   a discrimination signal generator providing a discrimination signal indicative of said modified first image signal being provided; and
   a second image processor overlaying at least a first raster scanning line and a second raster scanning line which is adjacent to the first scanning line of said modified first image signal responsive to said discrimination signal,
   further including a sync signal generator generating a sync signal including at least one of a horizontal sync signal and a vertical sync signal, and wherein said first image processor, said discrimination signal generator and said sync signal generator are disposed in a first apparatus and said second image processor is disposed in a second apparatus, and wherein said discrimination signal and said sync signal are transmitted from said first apparatus to said second apparatus using mutually different transmission channels.

14. An image display system for selectively displaying a first image signal and a second image signal having different scanning frequencies, comprising:
   a first image processor processing said first image signal of a first scanning frequency of a raster scanning system to a modified first image signal so as to change the frequency thereof substantially to correspond to a frequency of the second image signal;
   a discrimination signal generator providing a discrimination signal indicative of said modified first image signal being provided; and a second image processor overlaying at least a first raster scanning line and a second raster scanning line which is adjacent to the first scanning line of said modified first image signal responsive to said discrimination signal, wherein said discrimination signal is supplied only for said first image signal having a frequency thereof changed and involving interlacing of scan lines, and said discrimination signal instructs overlapping of redundant scanning lines so as substantially to prevent resolution distortion due to overlapping of differing scanning lines during interlacing scanning.

15. An image display system for selectively displaying a first image signal and a second image signal having different scanning frequencies, comprising:

a first image processor processing said first image signal of a first scanning frequency of a raster scanning system to a modified first image signal so as to change the frequency thereof substantially to correspond to a frequency of the second image signal;

a discrimination signal generator providing a discrimination signal indicative of said modified first image signal being provided; and a second image processor overlaying at least a first raster scanning line and a second raster scanning line which is adjacent to the first scanning line of said modified first image signal responsive to said discrimination signal, wherein said discrimination signal corresponds in timing to portions of display image signals having a frequency thereof changed and involving interlacing of scan lines, and said discrimination signal instructs overlapping of redundant scanning lines so as substantially to prevent resolution distortion due to overlapping of differing scanning lines during interlacing scanning.

16. An image display system as claimed in claim 15, wherein the second image processor includes a scanning line shifter shifting at least a redundant second raster scanning line to a position of the a first scanning line to effect overlaying thereof, responsive to said discrimination signal.

17. An image display system for selectively displaying a first image signal and a second image signal having different scanning frequencies, comprising:

a first image processor processing said first image signal of a first scanning frequency of a raster scanning system to a modified first image signal so as to change the frequency thereof substantially to correspond to a frequency of the second image signal;

a discrimination signal generator providing a discrimination signal indicative of said modified first image signal being provided; and a second image processor overlaying at least a first raster scanning line and a second raster scanning line which is adjacent to the first scanning line of said modified first image signal responsive to said discrimination signal, wherein said first image processor and said second image processor are only operative for said first image signal being derived from one of an NTSC signal and a PAL signal.

* * * * *